(12) United States Patent
Oran et al.

(10) Patent No.: US 6,904,037 B2
(45) Date of Patent: Jun. 7, 2005

(54) ASYMMETRIC IMPLEMENTATION OF DSVD FOR VOICE/DATA INTERNET ACCESS

(75) Inventors: David R. Oran, Acton, MA (US); Cary W. FitzGerald, Pleasanton, CA (US); Michael E. Knappe, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 08/743,837

(22) Filed: Nov. 5, 1996

(65) Prior Publication Data

US 2003/0026243 A1 Feb. 6, 2003

(51) Int. Cl.[7] .............................................. H04L 12/66
(52) U.S. Cl. ...................................... 370/352; 370/465
(58) Field of Search ................................ 370/351–356, 370/505, 400–402, 492–495, 465–466, 474; 375/222; 379/93.01–93.05, 93.09, 93.14, 91.34, 88.17, 90.01, 93.34

(56) References Cited

U.S. PATENT DOCUMENTS

| | | | |
|---|---|---|---|
| 4,523,055 A | 6/1985 | Hohl et al. | |
| 4,535,448 A | 8/1985 | Baxter et al. | |
| 4,644,532 A | 2/1987 | George et al. | |
| 4,740,955 A | 4/1988 | Litterer et al. | |
| 4,771,425 A | 9/1988 | Baran et al. | |
| 4,811,339 A | 3/1989 | Bouillot et al. | |
| 4,819,228 A | 4/1989 | Baran et al. | |
| 4,879,551 A | 11/1989 | Georgiou et al. | |
| 4,903,261 A | 2/1990 | Baran et al. | |
| 4,962,532 A | 10/1990 | Kasiraj et al. | |
| 4,970,678 A | 11/1990 | Sladowski et al. | |
| 4,991,169 A | 2/1991 | Davis et al. | |
| 5,020,058 A | 5/1991 | Holden et al. | |
| 5,059,925 A | 10/1991 | Weisbloom | |
| 5,072,449 A | 12/1991 | Enns et al. | |
| 5,088,032 A | 2/1992 | Bosack | |
| 5,115,431 A | 5/1992 | Williams et al. | |
| 5,121,390 A | 6/1992 | Farrell et al. | |
| 5,128,945 A | 7/1992 | Enns et al. | |
| 5,224,099 A | 6/1993 | Corbalis et al. | |
| 5,243,342 A | 9/1993 | Kattemalalavadi et al. | |
| 5,255,291 A | 10/1993 | Holden et al. | |
| 5,268,592 A | 12/1993 | Bellamy et al. | |
| 5,268,934 A | 12/1993 | Sharma et al. | 375/117 |
| 5,274,631 A | 12/1993 | Bhardwaj | |
| 5,274,635 A | 12/1993 | Rahman et al. | |
| 5,274,643 A | 12/1993 | Fisk | |
| 5,280,480 A | 1/1994 | Pitt et al. | |
| 5,280,500 A | 1/1994 | Mazzola et al. | |
| 5,301,274 A | 4/1994 | Li | 395/250 |
| 5,309,562 A | 5/1994 | Li | 395/200 |

(Continued)

OTHER PUBLICATIONS

Konexx DataTalk II Product Brochure, copyright 1996, pp. 1–2.

Primary Examiner—Steven Nguyen
(74) Attorney, Agent, or Firm—Marger, Johnson & McCollom, PC (57) ABSTRACT

Voice and data streams transmitted from a conventional DSVD modem are interfaced directly to a network access server through a modified DSVD modem according to the invention. The voice and data is formatted into network data packets that are then routed directly to different endpoints through the network access server. The modified DSVD modem includes a packet framer that removes conventionally transmitted V.76 DSVD framing formats and stuffs bytes into the voice and data to form network packets. The network access server then routes the voice and data packets to the different endpoints identified in a packet header. Since the voice and data are output from the DSVD modem in data packets, the voice and data can be routed more efficiently to different network endpoints.

24 Claims, 5 Drawing Sheets

DSVD AS AN ACCESS MECHANISM

U.S. PATENT DOCUMENTS

| | | | |
|---|---|---|---|
| 5,313,454 A | 5/1994 | Bustini et al. | |
| 5,317,562 A | 5/1994 | Nardin et al. | |
| 5,355,356 A | 10/1994 | Johann et al. | 369/59 |
| 5,359,592 A | 10/1994 | Corbalis et al. | |
| 5,379,327 A | 1/1995 | Sharma et al. | 375/121 |
| 5,386,567 A | 1/1995 | Lien et al. | |
| H1413 H | 2/1995 | Gunn | 375/8 |
| 5,394,394 A | 2/1995 | Crowther et al. | |
| 5,422,880 A | 6/1995 | Heitkamp et al. | |
| 5,428,608 A * | 6/1995 | Freeman et al. | 375/222 |
| 5,430,715 A | 7/1995 | Corbalis et al. | |
| 5,450,425 A | 9/1995 | Gunn et al. | 371/67.1 |
| 5,452,289 A | 9/1995 | Sharma et al. | 370/32.1 |
| 5,453,786 A | 9/1995 | Trent | |
| 5,453,986 A | 9/1995 | Davis et al. | 370/62 |
| 5,471,470 A | 11/1995 | Sharma et al. | 370/81 |
| 5,473,599 A | 12/1995 | Li et al. | |
| 5,473,607 A | 12/1995 | Hausman et al. | |
| 5,491,687 A | 2/1996 | Christensen et al. | |
| 5,491,804 A | 2/1996 | Heath et al. | |
| 5,500,859 A | 3/1996 | Sharma et al. | 370/81 |
| 5,509,006 A | 4/1996 | Wilford et al. | |
| 5,517,185 A | 5/1996 | Acimovic et al. | |
| 5,517,500 A * | 5/1996 | White | 370/352 |
| 5,519,704 A | 5/1996 | Farinacci et al. | |
| 5,535,204 A | 7/1996 | Li | 370/76 |
| 5,546,395 A | 8/1996 | Sharma et al. | 370/84 |
| 5,546,448 A | 8/1996 | Caswell et al. | 379/142 |
| 5,557,608 A * | 9/1996 | Calvignac | 370/494 |
| 5,602,846 A * | 2/1997 | Holmquist et al. | 370/384 |
| 5,608,786 A * | 3/1997 | Gordon | 379/100 |
| 5,610,910 A * | 3/1997 | Focsaneanu | 370/351 |
| 5,625,677 A * | 4/1997 | Feiertag | 370/352 |
| 5,684,825 A * | 11/1997 | Ko | 375/222 |
| 5,764,639 A * | 6/1998 | Staples et al. | 370/401 |
| 5,838,461 A * | 11/1998 | Hsieh | 379/93.24 |
| 6,173,044 B1 * | 1/2001 | Hortensius | 379/93.14 |

* cited by examiner

DSVD SYSTEM
FIG.1
(PRIOR ART)

DSVD MODEM BLOCK DIAGRAM
FIG.2
(PRIOR ART)

FIG.3

FIG. 4
MODIFIED DSVD MODEM

PACKET FRAMER/INTERLEAVER
FIG.5

ASYMMETRIC IMPLEMENTATION OF DSVD FOR VOICE/DATA INTERNET ACCESS

BACKGROUND OF THE INVENTION

This invention relates generally to transferring voice and data over Internet systems and more particularly to an asymmetric Digital Simultaneous Voice/Data system that facilitates transmission of voice and data to different endpoints.

Many home users have only one phone line, and hence use Digital Simultaneous Voice/Data (DSVD) modems to simultaneously transfer voice and data at the same time over a common communication channel. DSVD modems conforming to a V.34 standard are beginning to become available at low cost and are expected to be ubiquitous in new consumer-oriented personal computers. PC hardware and software companies expect to significantly reduce support costs by providing concurrent voice and data access for help desks and support organizations.

Conventional DSVD operates as an "end-to-end" system. In an end-to-end system, a communication channel, such as through a Plain Old Telephone Service (POTS) telephone call, directly connects two endpoints at the physical channel level. End-to-end systems differ from "access" systems where the communication channel connects to a packet switched network such as the Internet.

Figure 1:
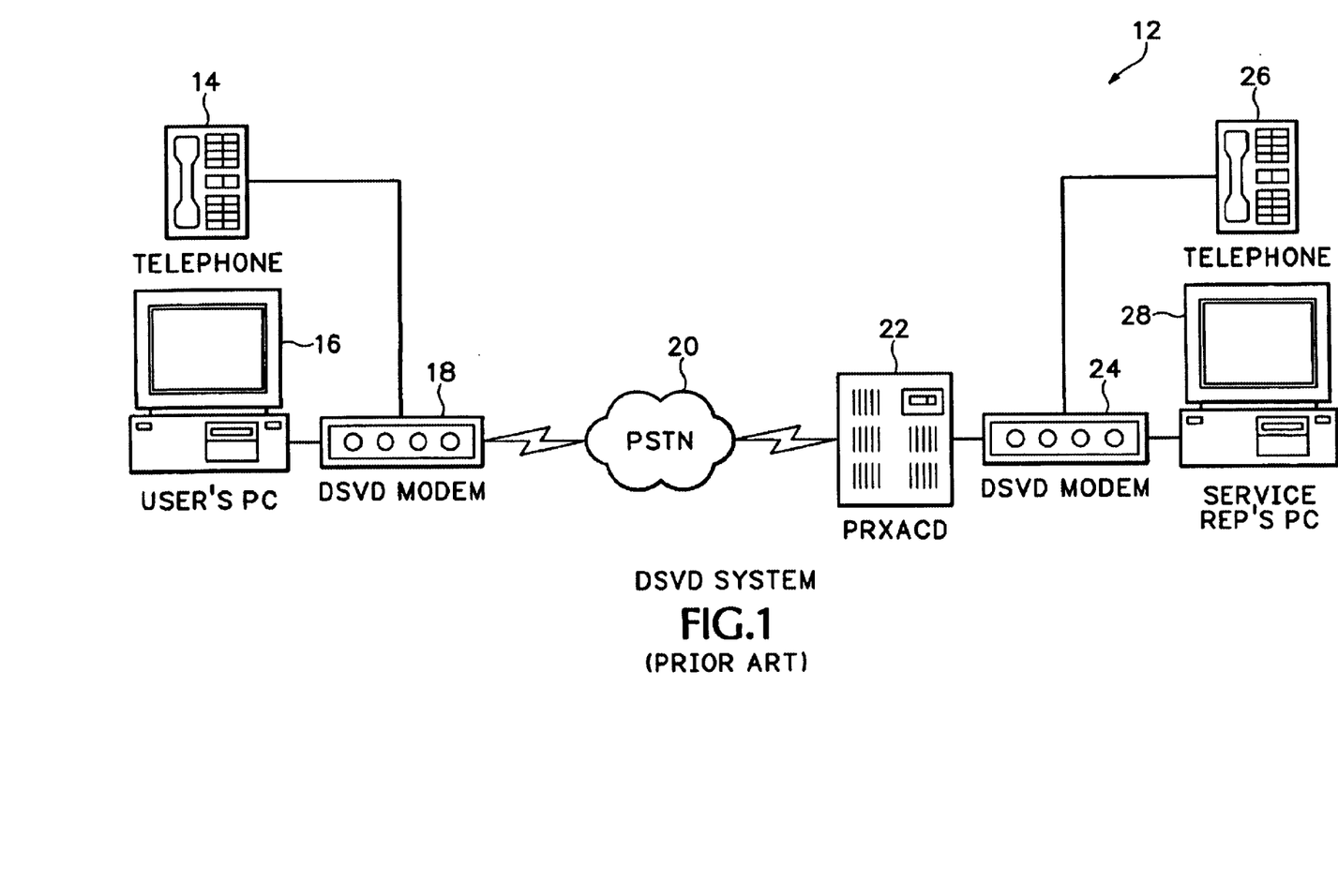
FIG. 1 is schematic diagram of a prior art DSVD system including a conventional DSVD modem.

FIG. 1 shows a typical implementation of DSVD as an end-to-end voice and data system 12. A telephone 14 and a personal computer 16 are each coupled to a conventional communication DSVD modem 18. The DSVD modem 18 is coupled through a Public Switched Telephone Network (PSTN) to a PBX telephone switching system 22. A second conventional DSVD modem 24 is coupled between the PBX 22 and a telephone 26 and a personal computer 28.

Figure 2:
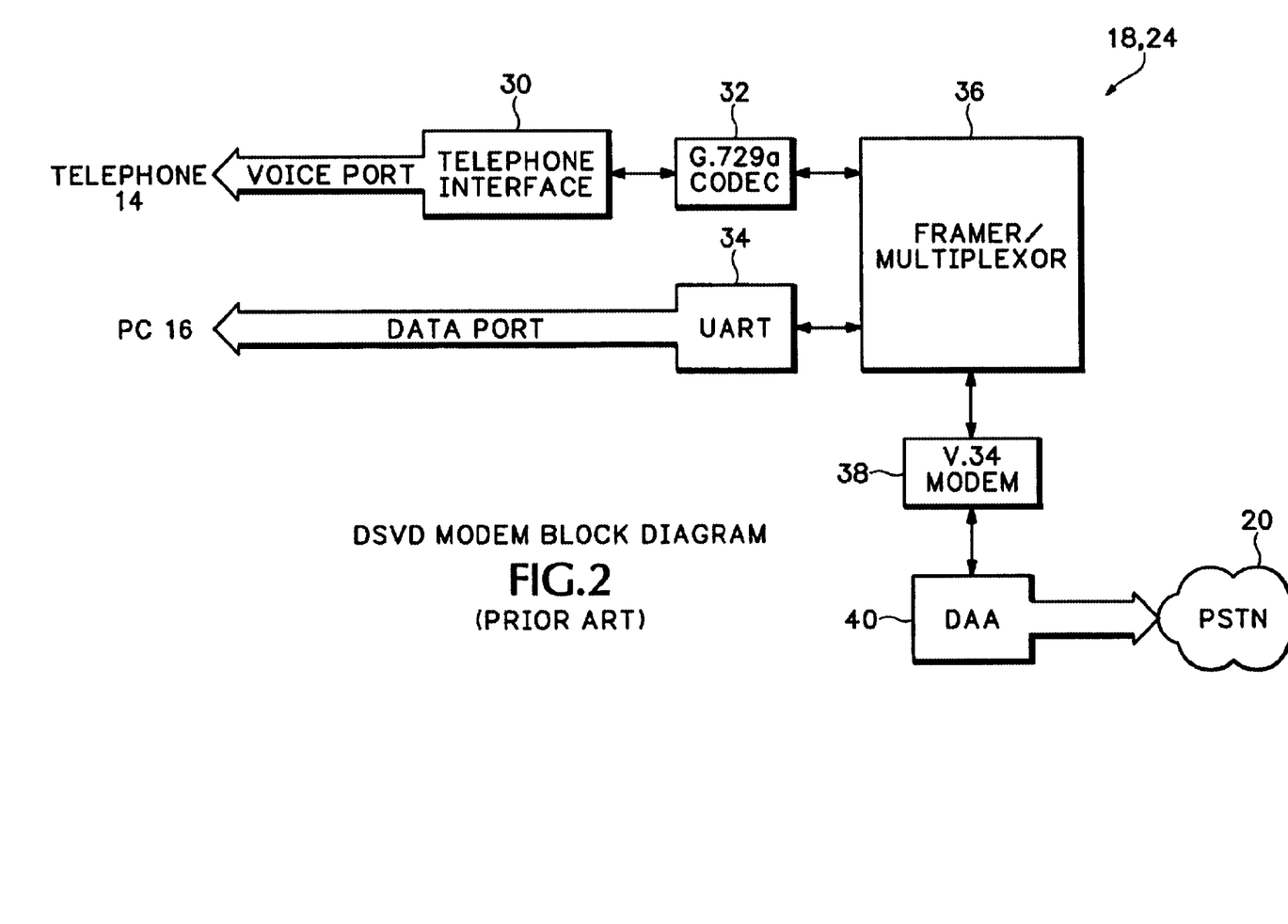
FIG. 2 is detailed block diagram of the DSVD modem shown in FIG. 1.

Referring to FIG. 2, each DSVD modem 18 and 24 includes a telephone interface 30 having a voice data port that connects to the telephone 14 (FIG. 1) for receiving analog voice signals. A UART 34 includes a data port that connects to the personal computer 16 (FIG. 1). The voice codec 32 is implemented either via a DSP or software running on a microprocessor, and digitizes the analog voice signal from telephone 14. The codec 32 then typically performs a voice compression algorithm based on a G.729 compression standard. A framer/multiplexer 36 is connected to both the codec 32 and the UART 34. The framer/multiplexer formats the voice and data into frames and then multiplexes the voice and data frames together into a continuous data stream. The data stream is transmitted by a V.34 data modem through a Data Access Arrangement (DAA) 40 over the PSTN 20.

The implementation of the DSVD modems 18 and 24 are symmetric meaning the voice data is encoded, compressed, and multiplexed with the computer character data for transmission at one end. The voice and character data is then de-multiplexed, decompressed, and decoded at the other end in a reverse manner. Such a scheme leads to a number of serious limitations on how DSVD may be employed.

In order to support both voice and data, symmetric DSVD requires a DSVD modem at both ends of the transmission channel. If one user has a DSVD modem and the other user only has a conventional modem used in conjunction with PC-based packet voice software, the two users cannot transmit voice data. Another substantial limitation is that DSVD systems are only capable of one physical channel switched connection at a time. Thus, in DSVD systems, the voice and data must always terminate at the same endpoint.

Consumers of the voice and data may not be at the same endpoint. For example, voice may be sent to a service representative for catalog company "A" while the data may be sent to a World Wide Web (WWW) site for company "B" to search for alternative pricing information. Other operations may also be performed on the transmitted voice stream, such as recording conversations, performing voice recognition, etc. However, the analog voice signal output from the DSVD modem cannot be directly processed in a digital signal processing environment. The analog voice signal would require reencoding back into a digital data format. Reencoding voice signals require additional time and signal processing circuitry. The quality of the voice signal also degrades each time the voice signal is encoded and decoded between an analog signal and digital data.

Accordingly, a need remains for a system that is more effective in transmitting and receiving voice and data to and from different network endpoints over the same communication channel.

SUMMARY OF THE INVENTION

Voice and data is transmitted over a public telephone line in a standard DSVD data format and then formatted into data packets. Because the voice is not decoded back into an analog voice signal, the voice and data stream output from a modified DSVD modem is interfaced directly to a network access server. The network access server is coupled to a network access system, such as Internet, for routing the voice and data packets to different endpoints. The endpoints comprise different computer and telephone systems. The telephone system receives voice packets from the access server through a separate telephony gateway.

The modified DSVD modem includes a packet framer that removes a conventional DSVD framing format data stream and stuffs bytes into the voice and data forming IP packets. The network access server then routes the voice and data packets to the different endpoints identified in a packet header. Since the voice and data are output from the DSVD modem as data packets, the voice and data can be routed more effectively using the data network to different endpoints.

When transmitting data to a conventional DSVD modem, byte stuff framing is removed from the voice and data packets. The packets are then segmented and interleaved together. DSVD framing is added to the interleaved segments forming a data stream that is transmitted via a V.34 modem over a telephone line to another DSVD modem. Because the data stream is always transmitted and received in a standard modem framing format, the system operates either with conventional DSVD modems or with the modified DSVD system described above.

The voice signal is no longer decoded or transcoded by the modified DSVD modem or the access server. Thus, the system overcomes limitations with conventional DSVD modems that require voice and data to terminate at the same endpoint. Voice quality is also improved since the voice signals do not require reencoding before retransmission. The improved DSVD system requires less circuitry than current DSVD modems and is, therefore, less expensive to manufacture. Cost savings multiply as the number of lines processed by an access server increases.

The foregoing and other objects, features and advantages of the invention will become more readily apparent from the following detailed description of a preferred embodiment of the invention which proceeds with reference to the accompanying drawings.

DETAILED DESCRIPTION

Figure 3:
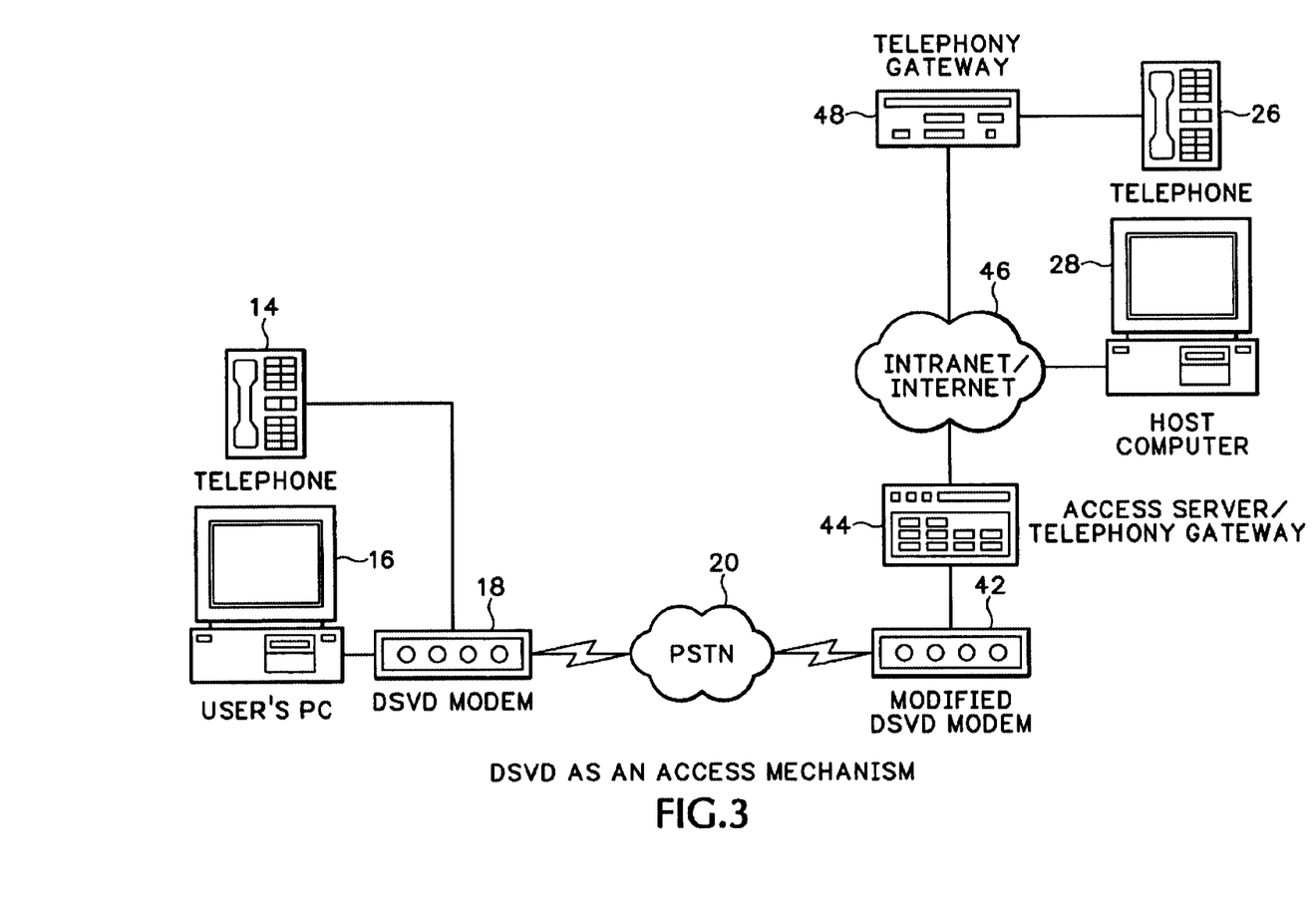
FIG. 3 is schematic diagram of a modified DSVD system according to the invention.

Referring to FIG. 3, a telephone 14, PC 16, DSVD modem 18 and PSTN 20 are used to transmit and receive voice and data in a similar manner as that previously described in FIG. 1. A modified DSVD modem 42 according to one embodiment of the invention is coupled between the PSTN 20 and an access server/telephony gateway 44. An access system 46 comprises an Intranet or Internet system that couples telephone 26 to the access server 44 through a telephony gateway 48 and couples a host computer 28 to the access server 44.

The network system 46 represents any standard packet switched network system. For example, the access system 46 represents a Local Area Network (LAN) or a Wide Area Network (WAN) 44 such as Ethernet, FDDI, T1/E1, T3/E3, ISDN PRI, or ATM. The access server 44 in one embodiment is a standard packet based router system such router Model No. AS50100 manufactured by Cisco Systems, 170 West Tasman Dr., San Jose, Calif. 95134-1706.

Telephony gateway 48, in one embodiment is a PC based telephony server which is commercially available from MICOM Communications Corp., 4100 Los Angeles Ave. Simi Valley, Calif. 93063. The telephony gateway includes a G.729 codec that decodes voice packets into analog voice data and dial-up circuitry for calling the telephone 26. Alternatively, the telephony gateway 48 uses a conventional DSVD modem 18 which includes a V.34 codec for converting the voice packets into analog voice signals. The host computer 28 represents any computer system that receives and transmits network data packets.

At the dial-up side of the DSVD transmission, electrical voice signals are generated by telephone 14 and digital data characters are generated by PC 16. The voice signals are converted into digital frames by the codec 32 (FIG. 2) and multiplexed with the digital data characters from PC 16 by DSVD modem 18. The DSVD modem 18 then transmits the multiplexed data stream containing the voice and data over PSTN 20 to the DSVD modem 42 which in part is the subject matter of the present invention. The DSVD modem on the dial-up end off-loads considerable computation by virtue of the G.729a voice codec 32.

The multiplexed voice and data stream transmitted by DSVD modem 18 is formatted into separate voice and data packets by modified DSVD modem 42. Of significant interest is the way in which the voice signal is maintained as digital data. Because the voice data is not converted back to an analog voice signal, both the digital character data from the PC 16 and the voice data from telephone 14 can be interfaced directly to access server 44 and then routed to different endpoints.

The voice packets in one embodiment are transferred to a telephony gateway 48 using an Internet protocol (IP). The IP address of telephony gateway 48 is contained in a destination address in a packet header constructed by the access server 44. The telephony gateway converts the voice packets into analog voice signals that are sent to telephone 26. Data packets are sent using the Internet protocol. The IP data packets include an associated IP destination address in a packet header. Access server 44 routes the data packets to the host computer 28 according to the IP destination address.

The destination addresses for the telephony gateway 48 and the host computer 28 are originally designated according to the phone number dialed up by telephone 14 and the IP addresses input via PC 16. For example, a user at PC 16 enters a web page address that corresponds with host computer 28.

The web page address is sent along with other character and voice data to modem 42. The web page address is formatted into a data packet header. The access server 44 uses the address to route the packet to host computer 28. The user dials the phone number of telephone 26 with telephone 14. The phone number is used to establish an end-to-end connection between DSVD modem 18 and modified DSVD modem 42. Access server 44 then converts the telephone number into an IP address associated with telephony gateway 48. Alternatively, the PC 16 is used to select the phone number for DSVD modem 42 and destination addresses for the different voice and data endpoints.

While shown as two separate boxes in FIG. 3, the modified DSVD modem 42 and the access server/telephony gateway 44 can be combined into the same device. The access server 44 can also serve as a telephony gateway when the modem 42 is a common endpoint for voice and data. The access server/telephony gateway 44 would then convert the digital voice data into an analog voice signal. For example, dial-up participants in a computer multi-media conferencing application may require voice and data to be directed to the same host system.

Figure 4:
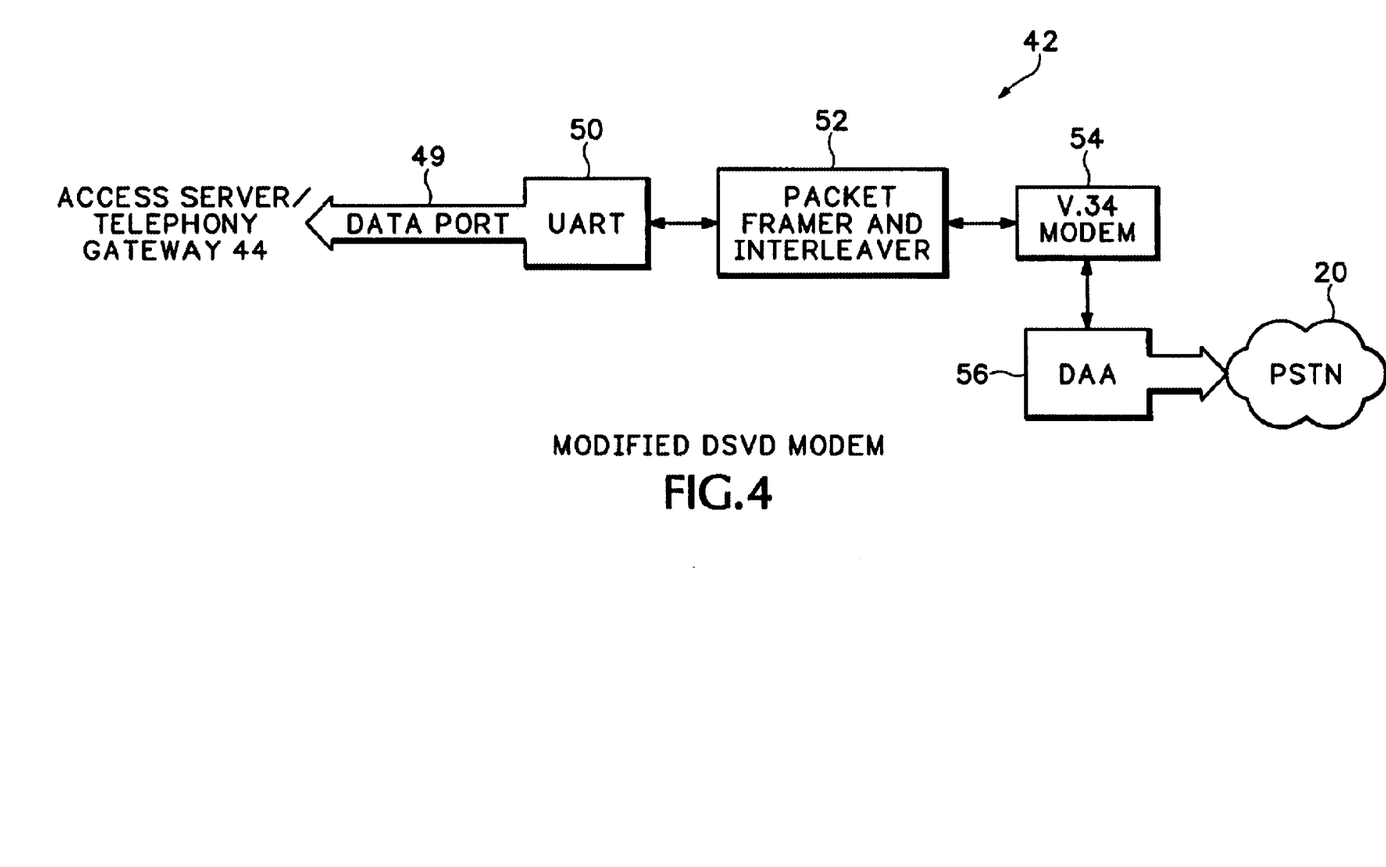
FIG. 4 is a detailed block diagram of a modified DSVD modem according to the invention.

Referring to FIG. 4, the system shown in FIG. 3 uses a novel implementation of DSVD where the voice channel, rather than being decoded, is interleaved in the data stream across the interface with the access server 44 as packets. A data port 49 couples a UART 50 to the access server 44 (FIG. 3). A packet framer and interleaver 52 couples the UART 50 to a V.34 modem 54 and a Data Access Arrangement (DAA) 56 couples the modem 54 to the PSTN 20.

The UART 50, V.34 Modem 54, and DAA 56 are the same components used in conventional DSVD modems. The DAA 56 provides isolation between circuitry coupled to the public phone network and is well known to those skilled in the art. The telephony interface 30 and G.729a CODEC 32 previously shown in FIG. 2 are eliminated. The framer/multiplexer 36 shown in FIG. 2 is replaced with a V.76 compliant packet framer and interleaver 52. The framer and interleaver 52 separates the voice from the data and frames the data and voice as interleaved packets on the same data port channel. This channel is presented to the UART 50 so that the voice and data frames enter and leave the system as serial packets over the same data port 49. The voice and data packets are then sent from the access server 44, through the Internet 46 and to the endpoint 26 or 28 in a compressed packetized form.

Figure 5:
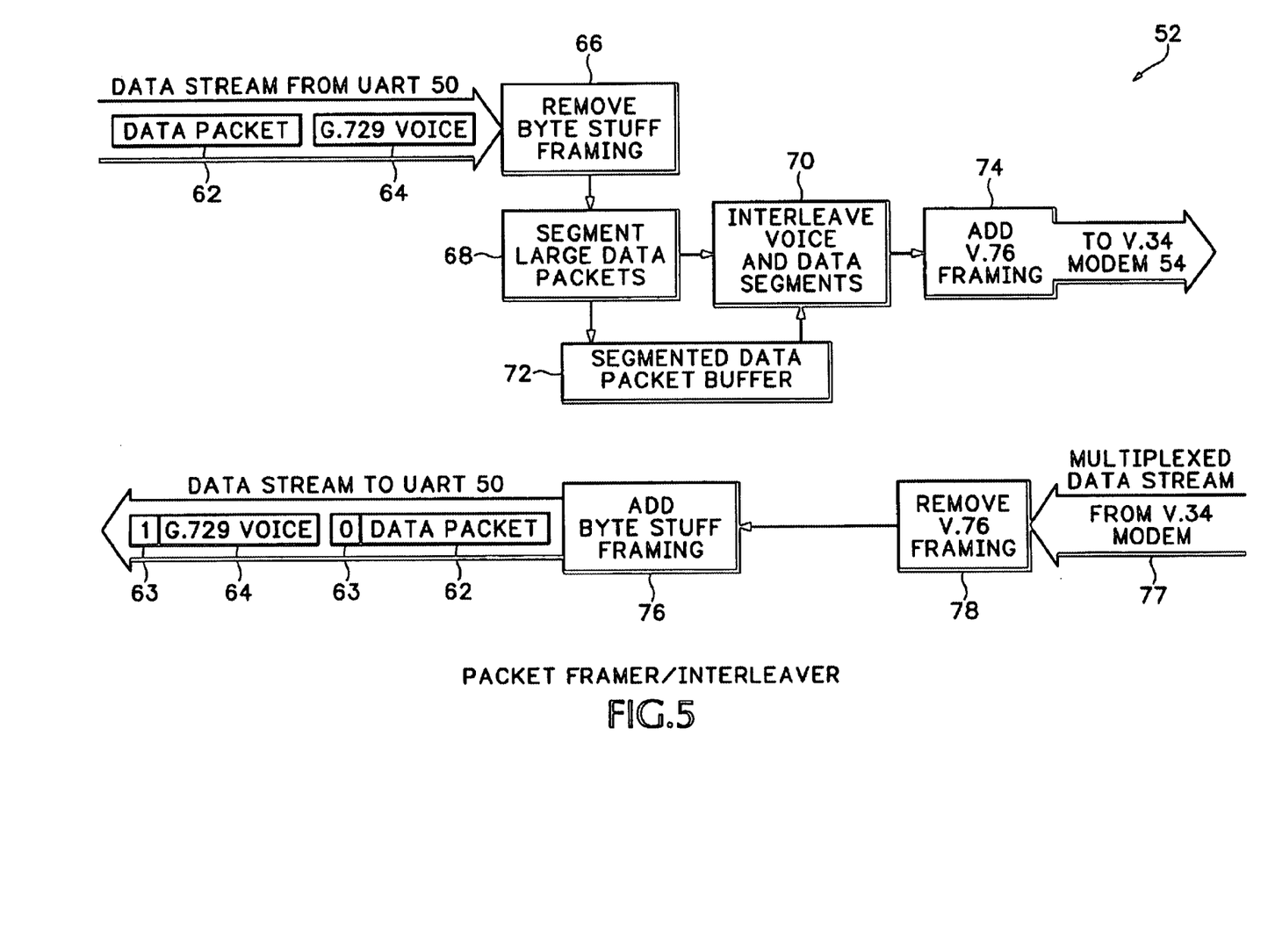
FIG. 5 is a detailed block diagram of a packet framer and interleaver for the DSVD modem shown in FIG. 4.

Referring to FIG. 5, voice and data is framed and interleaved in the DSVD modem in the following manner. Data packets 62 and G.729 voice packets 64 are received byte by byte through the UART 50 from telephone 26 and host computer 28 via network 46. The packets include byte-stuffed High-level Data Link Control (HDLC) framing conventionally used over Internet interfaces. The voice and data packets are distinguished by a Data Link Connection Identifier (DLCI) field in a packet header. A value of zero in the DLCI field identifies packets containing data and a value of one in the DLCI field identifies packets containing voice data.

The framer/interleaver 52 in block 66 accumulates the bytes for each voice and data packet and removes the byte-stuff framing of the network packet formatting. A segmenting block 68 breaks up each received data packet if longer than a given threshold size. The threshold data size is configurable through an interface on the DSVD modem 42 (not shown). If a packet does not require segmentation, it is sent directly to an interleaver 70. If the packet requires segmentation, the first segment is sent to the interleaver 70 and the rest of the packet is reframed and sent to a segment buffer 72.

The interleaver 70 accepts the next frame from the segment block 68 and if no segments exist in the segment buffer 72, sends the frame to a V.76 framer 74. If there are segmented frames in the segment buffer 72, after sending the next frame to the framer 74, the interleaver 70 sends one segment from the buffer 72 to the V.76 framer before accepting another voice frame from the segmenter 68. This interleaves voice frames between the segments of data frames in a manner compatible with the segmentation scheme of the V.76 modem standard. The V.76 framer 70 performs the framing operations required to produce a V.76 compliant data stream compatible with the V.34 modem 54.

Voice and data received over the PSTN 20 from a standard DSVD modem are processed by the framer and interleaver 52 in the following manner. Frames are transmitted in a multiplexed data stream 77 and received through the V.34 modem 18 in a V.76 framing format (FIG. 1). The V.76 multiplexed framing is removed from the data stream in block 78. The voice and data is converted in block 76 by byte-stuffing the data into HDLC packets for transmission over network system 46. The DLCI field in a frame header 63 is set to zero for data packets 62 and set to one for voice packets 64. The packets are then output to the UART 50 byte-by-byte.

The invention is particularly attractive for servers employing internal banks of V.34 modems since little or no additional hardware is required to process the voice along with the other data. The invention also interfaces well with Voiceover-IP (VOIP) products which provide capabilities such as the telephony gateway 48 that carry the voice end-to-end over a packet switched network interfacing to standard telephone extensions, PBXs and the PSTN 20.

Performance of access servers is enhanced by offloading voice coding and compression to the DSVD modem attached to the user's computer. The feature set of the access servers is expanded by providing an attractive way of accessing the network through DSVD modems. The cost of sending voice through access servers is considerably decreased since the expense of DSPs to process the voice is eliminated for those channels handling DSVD. Voice quality is also improved because the voice signal does not have to be reencoded after the voice decoding preformed by conventional DSVD modems.

Having described and illustrated the principles of the invention in a preferred embodiment thereof, it should be apparent that the invention can be modified in arrangement and detail without departing from such principles. I claim all modifications and variation coming within the spirit and scope of the following claims.

What is claimed is:

1. A Digital Simultaneous Voice/Data (DSVD) endpoint, comprising:

a data port interface for coupling to an access server or telephony gateway for generating an Internet Protocol (IP) voice packet to transmit to a telephone having an IP address corresponding to the IP voice packet and an IP data packet to transmit to a computer having an IP address corresponding to the IP data packet via an Internet network and configured to transmit and receive both the voice packets and the data packets;

a circuit switched interface for coupling to a circuit switched network;

a modem configured to receive and transmit a Digital Simultaneous Voice/Data (DSVD) data stream containing DSVD multiplexed voice and digital data from a remote DSVD endpoint; and a framer and interleaver configured to interleave the voice and data packets together, and add DSVD madam framing to the interleaved voice and data packets;

the framer and interleaver further configured to remove DSVD modem framing from the DSVD multiplexed voice and digital data received over the circuit switched interface and transmit both the voice and digital data over the data port interface over the Internet network to the access server or telephony gateway;

the DSVD endpoint not compressing or decompressing the voice data contained in the DSVD data stream or the voice packets transmitted between the remote DSVD endpoint and the access server or telephony gateway and deriving the IP addresses corresponding to the IP voice packet and the IP data packet using only the DSVD data stream.

2. A DSVD endpoint according to claim 1, wherein the modem comprises a V.34 modem.

3. A DSVD endpoint according to claim 2, wherein the framer and interleaver adds V.76 framing before sending the interleaved voice and data packets to the V.34 modem.

4. A DSVD endpoint according to claim 1, wherein the framer and interleaver segments the voice and data packets received over the data port and interleaves the segmented voice and data packets.

5. A DSVD endpoint according to claim 1, wherein the data port interface, circuit switched interface, modem, and framer and interleaver comprise a standalone device operating in a separate enclosure from any access server or telephony gateway coupled to the data port interface.

6. A method for processing a Digital Simultaneous Voice/Data (DSVD) data stream, comprising:

receiving and transmitting the Digital Simultaneous Voice/Data (DSVD) data stream containing DSVD multiplexed voice and digital data over a circuit switched interface located in a first DSVD endpoint and establishing the DSVD data stream with a second DSVD endpoint;

removing DSVD modem framing from the DSVD multiplexed voice and digital data received over the circuit switched interface;

transmitting both the voice and digital data as interleaved packets over a same data port interface of the first DSVD endpoint to an access server or telephony gateway for generating an Internet Protocol (IP) voice packet to transmit to a telephone having an IP address corresponding to the IP voice packet and an IP data packet to transmit separately to a computer having an IP address corresponding to the IP data packet via an Internet network: and the first DSVD endpoint not compressing or decompressing the voice data contained in the DSVD data stream or the voice packets received over the data port interface between the second DSVD endpoint and the access server or telephony gateway.

7. A method according to claim 6, including using a V.34 modem for transmitting and receiving the DSVD data stream.

8. A method according to claim 7, including removing V.76 framing from the DSVD data stream received from the V.34 modem.

9. A method according to claim 6, including segmenting the voice and data packets and interleaving the segmented voice and data packets.

10. A method according to claim 6, including:

enclosing circuitry for transmitting and receiving the voice packets and data packets, and transmitting and receiving the Digital Simultaneous Voice/Data (DSVD) data stream in a standalone DSVD enclosure; and coupling the stand alone DSVD enclosure to a stand alone access server gateway.

11. An electronic storage medium containing software used for processing a Digital Simultaneous Voice/Data (DSVD) data stream, comprising:

code for receiving and transmitting the Digital Simultaneous Voice/Data (DSVD) data stream containing DSVD multiplexed voice and digital data over a circuit switched interface located in a first DSVD endpoint and establishing the DSVD data stream with a second DSVD endpoint;

code for removing DSVD modem framing from the DSVD multiplexed voice and digital data received over the circuit switched interface;

code for transmitting both the voice and digital data as interleaved packets over a data port interface of the first DSVD endpoint to an access server or telephony gateway for generating an Internet Protocol (IP) voice packet to transmit to a telephone having an IP address corresponding to the IP voice packet and an IP data packet to transmit separately to a computer having an IP address corresponding to the IP data packet via an Internet network; and code for the first DSVD endpoint not compressing or decompressing the voice data contained in the DSVD data stream or the voice packets received over the data port interface between the second DSVD endpoint and the access server or telephony gateway.

12. An electronic storage medium according to claim 11 including code for using a V.34 modem for transmitting and receiving the DSVD data stream.

13. An electronic storage medium according to claim 12 including code for removing V.76 framing from the DSVD data stream received from the V.34 modem.

14. An electronic storage medium according to claim 11 including code for segmenting the voice and data packets and interleaving the segmented voice and data packets.

15. An electronic storage medium according to claim 11 including:

code for enclosing circuitry for transmitting and receiving the voice packets and data packets, and code for transmitting and receiving the Digital Simultaneous Voice/Data (DSVD) data stream in a standalone DSVD device; and code for coupling the stand alone DSVD device to a stand alone access server gateway.

16. A system for processing a Digital Simultaneous Voice/Data (DSVD) data Stream, comprising:

means for receiving and transmitting the Digital Simultaneous Voice/Data (DSVD) data stream containing DSVD multiplexed voice and digital data over a circuit switched interface located in a first DSVD endpoint and establishing the DSVD data stream with a second DSVD endpoint;

means for removing DSVD modem framing from the DSVD multiplexed voice and digital data received over the circuit switched interface;

means for transmitting both the voice and digital data as interleaved packets over a data port interface to an access server or telephony gateway for generating an Internet Protocol (IP) voice packet to transmit to a telephone having an IP address corresponding to the IP voice packet and an IP data packet to transmit separately to a computer having an IP address corresponding to the IP data packet via an Internet network; and means for the first DSVD endpoint not compressing or decompressing the voice data contained in the DSVD data stream or the voice packets received over the data port interface between the second DSVD endpoint and the access server or telephony gateway.

17. A system according to claim 16 including means for using a V.34 modem for transmitting and receiving the DSVD data stream.

18. A system according to claim 17 including means for removing V.76 framing from the DSVD data stream received from the V.34 modem.

19. A system according to claim 16 including means for segmenting the voice and data packets and interleaving the segmented voice and data packets.

20. A system according to claim 16 including:

means for enclosing circuitry for transmitting and receiving the voice packets and data packets, and means for transmitting and receiving the Digital Simultaneous Voice/Data (DSVD) data stream in a standalone DSVD device; and means for coupling the stand alone DSVD device to a stand alone access server gateway.

21. A Digital Simultaneous Voice/Data (DSVD) endpoint, comprising:

a data port interface configured to communicate with an access server or telephony gateway for generating an Internet Protocol (IP) voice packet to transmit to a telephone having an IP address corresponding to the IP voice packet and an IP data packet to transmit separately to a computer having an IP address corresponding to the IP data packet via an Internet network;

a circuit switched interface configured to communicate with a remote endpoint over a circuit switched network;

a modem configured to establish a Digital Simultaneous Voice/Data (DSVD) data stream containing multiplexed voice and digital data with the remote endpoint; and a circuit configured to convert between the (DSVD) multiplexed voice and digital data and the IP voice packets and IP data packets;

the endpoint not compressing or decompressing the voice data contained in the DSVD data stream or the voice packets transmitted between the remote endpoint and the access server or telephony gateway.

22. A Digital Simultaneous Voice/Data (DSVD) endpoint according to claim 21 wherein the circuit comprises a framer and interleaver.

23. A Digital Simultaneous Voice/Data (DSVD) endpoint according to claim 22 wherein the framer and interleaver segments the voice and data packets received over the data port and interleaves the segmented voice and data packets.

24. A Digital Simultaneous Voice/Data (DSVD) endpoint according to claim 23 wherein the data port interface, circuit switched interface, modem, and framer and interleaver comprise a standalone device operating in a separate enclosure from any access server or telephony gateway coupled to the data port interface.

* * * * *

UNITED STATES PATENT AND TRADEMARK OFFICE
CERTIFICATE OF CORRECTION

PATENT NO. : 6,904,037 B2 Page 1 of 1
APPLICATION NO. : 08/743837
DATED : June 7, 2005
INVENTOR(S) : Oran et al.

It is certified that error appears in the above-identified patent and that said Letters Patent is hereby corrected as shown below:

At column 6, line 22, please replace "madam" with --modem--

Signed and Sealed this

Thirty-first Day of October, 2006

JON W. DUDAS
*Director of the United States Patent and Trademark Office*